United States Patent
Hepner et al.

[11] 3,995,936
[45] Dec. 7, 1976

[54] MAGNETO-OPTICAL PROPAGATION MODE CONVERTER

[75] Inventors: Georges Hepner; Bernard Désormière, both of Paris, France

[73] Assignee: Thomson-CSF, Paris, France

[22] Filed: Aug. 5, 1975

[21] Appl. No.: 602,009

[30] Foreign Application Priority Data

Aug. 9, 1974 France .............................. 74.27764

[52] U.S. Cl. .......................... 350/96 WG; 350/151
[51] Int. Cl.² ......................................... G02B 5/14
[58] Field of Search ........ 250/227; 350/96 R, 96 B, 350/96 WG, 160, 151, 157; 307/88.3

[56] References Cited

UNITED STATES PATENTS 3,764,195  10/1973  Blank et al. ................... 350/96 WG
3,830,555  8/1974  Warner ........................ 350/96 WG

*Primary Examiner*—David C. Nelms
*Attorney, Agent, or Firm*—Cushman, Darby & Cushman

[57] ABSTRACT

A device for converting the propagation mode of radiated energy, ulitizing the Cotton-Mouton effect. It is constituted by a substrate upon which there is deposited an epitaxially produced film of yttrium-iron garnet, magnetized in a direction having at least one component normal to the direction of energy propagation, and with a thickness such that the propagation velocities of the two modes, initial and final, are identical to one another.

8 Claims, 4 Drawing Figures

MAGNETO-OPTICAL PROPAGATION MODE CONVERTER

The present invention relates to radiated energy guidance in integrated optical systems, and more particularly to a device which converts the propagation mode of the guided energy and employs magneto-optical effects for the purpose.

Those skilled in the art will recall that in integrated optical systems, thus called by analogy with integrated electronic circuits, the radiated energy is guided by total reflections at the walls of a waveguide constituted by a thin film of high refractive index, deposited upon a substrate. The radiated energy propagates through such a waveguide in accordance with a discrete number of modes.

It is possible to design a mode converter utilising magneto-optical effects, as for example the Faraday effect. To this end, in order to guide the radiated energy, a magnetic film magnetised in the propagation direction is used; if, for example at the input of the device, the guided mode is of the TE type, during propagation a fraction of the energy will occur in the form of the TM mode. Thus, a TE to TM mode converter can be created. However, this kind of converter has major drawbacks: On the one hand, the conversion ratio is low and on the other the conversion balance cancels out periodically as a consequence of the phase-shifts which are due to a difference between the propagation velocities of the energy in the initial and final modes.

To overcome this drawback, various solutions have been proposed amongst which the technique of periodic reversal of the direction of magnetisation, so that the effects of conversion are additive, or again the technique of adding an anisotropic film to the waveguide in order, through the double-refraction effect, to compensate for the aforementioned difference in the propagation velocities. However, both of these solutions involve considerable complications in manufacture.

The object of the present invention is to avoid these various drawbacks by the utilisation of a structure in which said difference between the propagation velocities is zero. To this end, the invention employs another magneto-optical phenomenon, known as the Cotton-Mouton effect, this being a particularly marked phenomenon in ferrimagnetic material of the garnet type.

According to the invention, there is provided a device for converting the propagation mode of radiated energy, utilising magneto-optical effects, from a first mode to a second mode, said device comprising a layer of a ferrimagnetic material in which the radiated energy is guided in accordance with the first mode, the magnetisation of said layer exhibiting at least one component in a direction normal to the propagation direction of said radiated energy, the thickness of said layer being such that the propagation velocities of the radiated energy, in first of second modes, are substantially equal.

For a better understanding of the invention and to show how the same may be carried into effect, reference will be made to the ensuing description and the related drawings in which.

Figure 1:
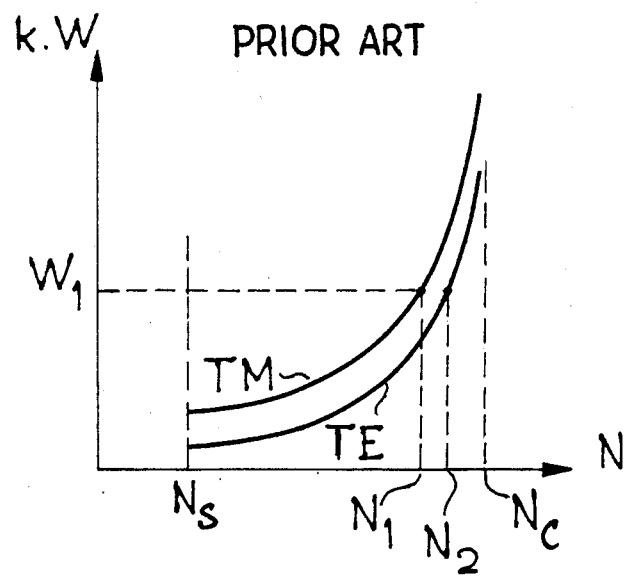
FIGS. 1 and 2 are explanatory diagrams relating in the case of the former to prior art devices and in the case of the latter, to the device in accordance with the invention.

In the drawings, like references denote like components.

FIG. 1 illustrates the dispersion graphs for the energy propagating through a mode converter of known type, based upon a magneto-optical effect known as the Farraday effect.

Those skilled in the art will recall that this phenomenon occurs when light propagates through a magnetic material whose magnetisation is parallel to the direction of propagation of the energy or at least possesses a component in said direction. The effect is to rotate the polarisation of the light through an angle which is proportional to the intersection length, this in a direction which depends solely upon the direction of the magnetisation and not upon the propagation direction: this is a non-reciprocal effect.

To design a converter using this kind of structure, an interaction length is chosen such that the rotation obtained is $\pi/2$ for example, if the initial mode is a TE mode and the final desired mode a TM mode.

As stated earlier, a major drawback of this kind of device arises out of the fact that the propagation velocities of the energy in each of the modes are not the same, as FIG. 1 shows. In this figure, the abscissae plot the quantity N known as the effective refractive index of the waveguide and equal to $\beta/k$, where $\beta$ is the propagation factor of the guided wave and $k$ is wave number ($k = 2\pi/\lambda$, where $\lambda$ is the wavelength), whilst the ordinates plot the product $kW$, where W is the waveguide thickness.

Two graphs have been shown, one corresponding to an initial TE mode and the other to the desired TM mode, for example the fundamental modes $TE_o$ and $TM_o$.

The graphs TE and TM are limited towards the lower values, by a straight abscissa line $N_s$ and towards the higher values by a straight abscissa line $N_c$ at which they are both asymptotic, $N_s$ being the refractive index of the substrate and $N_c$ the refractive index of the waveguide.

As the diagram shows, at a given thickness of the waveguide ($W_1$ for example) different effective refractive indices $N_1$ and $N_2$ are obtained for each of the modes TM and TE, that is to say different propagation factors ($N = \beta/k$). The effect of this difference, as stated earlier, is a periodic cancellation of the conversion balance.

Figure 2:
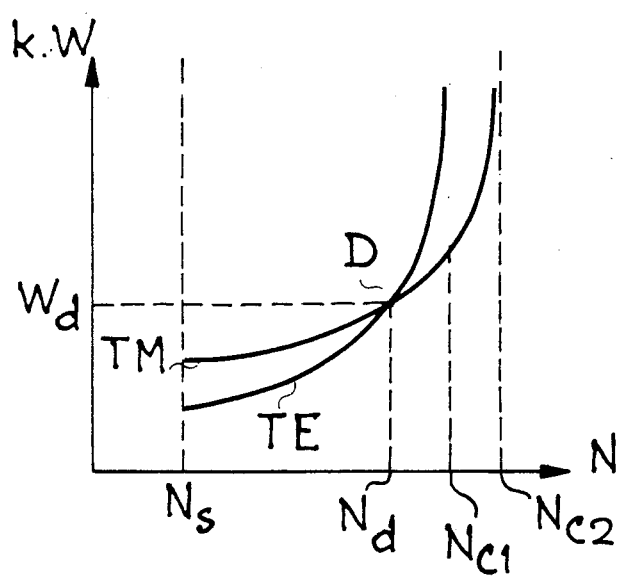
Figure 3:
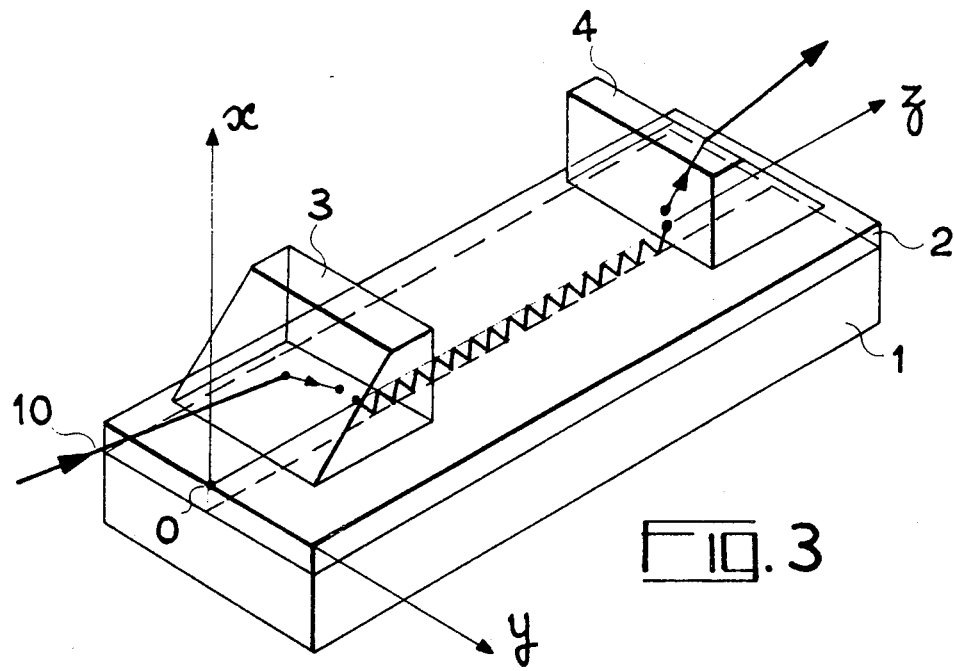
FIG. 3 illustrates an embodiment of the device in accordance with the invention.

FIG. 2 illustrates dispersion graphs pertaining to the energy propagating through the device in accordance with the invention, an embodiment of said device having been shown in FIG. 3.

In FIG. 3, the device in accordance with the invention is constituted by a substrate 1 made for example of a non-magnetic gadolinium-gallium garnet, upon which a film 2 is constituted by a ferrimagnetic garnet produced by hetero-epitaxy. To this end, there is lodged in a furnace a crucible containing the epitaxial bath which is constituted by yttrium and iron oxides plus flux (for example lead oxide and boron oxide). The substrate 1 is immersed in the supercooled bath and made to execute a rotary motion about a vertical axis at a speed in the order of 100 r.p.m. Once the resultant wafer has been removed from the bath, it is rotated at a high speed, of the order of 1500 r.p.m., in order to eliminate the flux from the epitaxially grown layer.

In a first embodiment, the direction of magnetisation of the material is contained in the plane of the film 2, this plane being refered to as yOz on the figure, Oz being the propagating direction of the energy. The magnetisation is then oriented along the axis Oy, the electro-magnetic means required to produce this kind of magnetisation being conventional in nature and not having been shown in the figure.

In FIG. 3, there has also been illustrated an embodiment of the input and output means for the radiated energy, said means having been marked 3 and 4 respectively and being described in detail herebelow.

Since this structure has magnetisation normal to the propagation direction Oz, the Faraday effect referred to earlier no longer occurs and is replaced instead by another magneto-optical phenomenon, the Cotton-Mouton effect.

It will be remembered that the effects of this phenomenon are of the same order of magnitude as those of the Faraday effect, althrough a little weaker in certain materials such as ferrimagnetic materials of the yttrium-iron or terbium-iron garnet type or, more generally, rare earth and iron garnet type. This phenomenon results in a transfer of energy from one propagation mode to the other if propagation takes place in certain preferred crystalline directions. This is a reciprocal effect similar to that encountered in a double-refractive medium.

It will be observed that if we consider the Cotton-Mouton effect, the material no longer behaves isotropically that is to say there is no longer a single effective refractive index for the waveguide in all directions ($N_c$ in FIG. 1); this is translated, in the dispersion graphs of FIG. 2, by the existence of two asymptotes, one ($N_{c1}$) corresponding in the example of the figure to the refractive index in the direction Oy and to the TE mode, and the other ($N_{c2}$) corresponding then to the refractive index in the direction Ox and to the TM mode. The consequence of this anisotropy is that the two films intersect at the point D, whose abscissa is $N_d$ and ordinate $W_d$, to which intersection there corresponds a single propagation velocity $\beta_d$, ($N_d = \beta d/k$), thus determining the thickness $W_d$ of the wave guide 2.

By way of example, a converter has been manufactured in which the waveguide 2 is constituted by yttrium-iron garnet operating at the point D corresponding to a thickness $W_d$ of the order of 7 $\mu$.

The input and output for the energy are designed in a conventional manner as prisms (3 and 4). In other words, because of the phenomenon of total reflection occurring at the interface of the diopter constituted by waveguide 2 and air, this being necessary for the propagation of the energy through the waveguide, it is impossible to introduce the energy by simple refraction. In the embodiment shown in FIG. 3, a prism 3 is utilised the base of which is arranged opposite the top face of the waveguide 2 at a distance which at the most is in the order of magnitude of the wavelength of the energy. A beam 10 of monochromatic and coherent radiant energy, emitted for example by a laser, is incident upon one face fo the prism at an angle of incidence such that the beam encounters conditions of total reflection at the internal face of the base of the prism. As those skilled in the art will comprehend, under these conditions an energy transfer occurs from the prism 3 to the waveguide 2 through the medium of evanescent waves which are then created between the prism and the waveguide. The extraction of the energy from the waveguide 2 is effected in the same fashion by coupling between it (2) and a second prism (4) arranged on the waveguide in the same manner as the prism 3, coupling taking place due to the evanescent waves created at the time of the total reflections occurring at the interface between waveguide 2 and air.

In a second embodiment, the magnetisation $\vec{M}$ of the ferrimagnetic layer (2) is still perpendicular to Oz, but located in the plane xOy and makes an angle $\alpha$ with the axis Oy of the order of 45°, this orientation being obtained with the help of external magnetic fields (not shown) directed along Ox and Oy, the field along Oy being necessary in order to maintain $\vec{M}$ in the plane xOy.

In other words, the method of producing the ferrimagnetic film 2, namely by epitaxy, results in an inherent film anisotropy, that is to say that its structure is uniaxial rather than cubic, which has the additional effect that it makes it possible to achieve a single propagation velocity for both modes, as experience has shown, and permits the conversion efficiency to be maximum: calculations show that conversion efficiency is a function of sin 2$\alpha$, that is to say that it is at a maximum when the magnetisation $\vec{M}$ is at 45° to the axis Oy in the plane xOy, and this is again borne out by experience.

Figure 4:
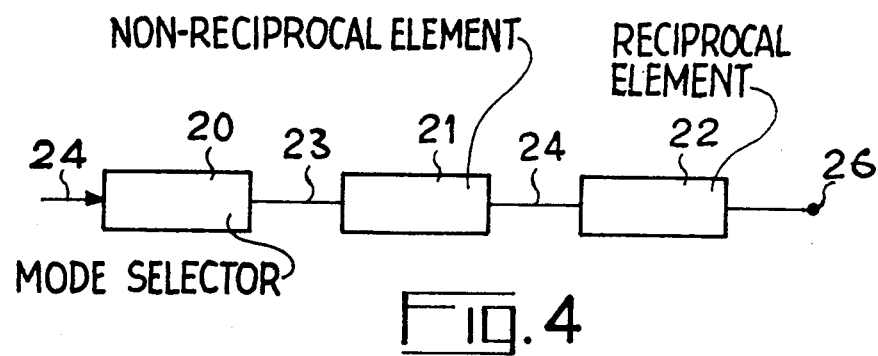
FIG. 4 illustrates the application of the device in acordance with the invention to the design of non-reciprocal junctions.

The converter in accordance with the invention can in particular be employed to form a non-reciprocal junction such as shown in FIG. 4, or, more generally, a circulator.

It will be remembered that the term non-reciprocal junction designates a junction which only allows waves to propagate in one direction, and that the term circulator designates a transmission device, conventionally having three channels, such that an electromagnetic wave entering through one channel selected as the input channel, is transmitted to only one output channel, adjacent the first.

FIG. 4 is a diagram showing a mode selector 20 with an input 24 connected to a non-reciprocal element 21 through a connection 23, the element 21 being connected to a reciprocal element 22 through a connection 24 and the latter being connected to the exterior through a connection 26.

When TE mode energy (for example) is applied for example to the input 24 of the mode selector 20, the function of the latter is to transmit said energy without modification, to the element 21. The non-reciprocal element 21 and the reciprocal element 22 both have the effect of transforming a single mode at the input, into two modes of like intensity but whose relative phase-shift is zero in the case of the non-reciprocal element 21 and equal to $\pi$ or zero in the case of the reciprocal element 22, depending upon whether the energy is received through the connection 24 or 26. Thus, a TE mode applied to the input 23 remains a TE mode at the output 26 but a TE mode applied to the input 26 is converted into a TM mode at the connection 23. The mode selector 20 thus has the function of absorbing said TM mode.

To this end, the element 21 is preferably made in the form of a waveguide of a ferrimagnetic material magnetised in a direction comprising a component in the direction of energy propagation, so that the Faraday effect is exploited, but also comprising a component normal to the direction of propagation so that the anisotropic structure due to the Cotton-Mouton effect is created; it should be pointed out that from the quantitative point of view, conversion by the Cotton-Mouton effect does not substantially affect conversion by the Faraday effect. The element 21 can also be realised with the help of a waveguide of ferrimagnetic garnet (yttrium-iron for example) produced epitaxially on a nonmagnetic garnet substrate (gadolinium-gallium for example) whose magnetisation is disposed parallel to the energy propagation direction, the epitaxial structure making it possible, due to its inherent anisotropy as stated before, to achieve a satisfactory conversion efficiency through the Faraday effect. By way of example, for a magnetic field applied in the energy propagation direction, of the order of around ten Oersteds, a mode conversion ratio of around 75% is obtained over an interaction length of the order of 6 mm. The reciprocal element 22 is formed with the help of a device smaller to that in accordance with the invention, comprising an energy guide made of a ferrimagnetic garnet and magnetised in a direction perpendicular to the propagation direction.

It will be observed that the device schematically shown in FIG. 4 constitutes a non-reciprocal junction vis-a-vis the TE mode, transmitting energy in only one direction.

In addition, it is possible to utilise the same device in order to form the two elements 21 and 22: it is merely necessary to arrange for the magnetisation to be disposed obliquely in relation to the propagation direction, so that the Faraday and Cotton-Mouton effects are cumulative.

What is claimed is:

1. A device for at least partially converting the propagation mode of radiated energy, utilising magneto-optical effects, from a first mode to a second mode, said device comprising a layer of a ferrimagnetic material in which the radiated energy is guided in accordance with the first mode, the magnetisation of said layer exhibiting at least one component in a direction normal to the propagation direction of said radiated energy, the thickness of said layer being such that the propagation velocities of the radiated energy, in first of second modes, are substantially equal.

2. A device as claimed in claim 1, wherein said ferrimagnetic material is a ferrimagnetic garnet.

3. A device as claimed in claim 2, wherein said ferrimagnetic garnet is a yttrium-iron garnet.

4. A device as claimed in claim 1, further comprising a substrate for said layer of ferrimagnetic material, said substrate being constituted by a gadolinium and gallium garnet.

5. A device as claimed in claim 4, wherein said ferrimagnetic material layer is an anisotropic epitaxial layer.

6. A device as claimed in claim 1, wherein said magnetisation is orientated in a direction substantially parallel to the plane of said layer.

7. A device as claimed in claim 1, wherein the direction of said magnetisation is substantially contained in a plane normal to said radiated energy propagation direction.

8. A device as claimed in claim 7, wherein the direction of said magnetisation makes an angle of substantially 45° with the plane of layer.

* * * * *